Patented Aug. 8, 1950

2,517,541

UNITED STATES PATENT OFFICE 2,517,541

SENSITIVE PHOTOGRAPHIC EMULSIONS

Jens Herman Christensen, Holte, Denmark

No Drawing. Application September 7, 1948, Serial No. 48,160. In Great Britain September 27, 1947

4 Claims. (Cl. 95—7)

This invention relates to photographic silver halide emulsions.

One object of the invention is to increase the contrast of a sensitive silver halide emulsion. It has been found that the gradation obtainable in a sensitive silver halide emulsion, especially one containing silver chloride, can be modified by including in the emulsion a water-soluble cobalticyanide, especially an alkali metal cobalticyanide such as potassium cobalticyanide. The quantity of colbalticyanide necessary for this purpose, is much less than 0.1% by weight of the wet emulsion and quantities less than 0.01% by weight of the wet emulsion have quite a useful effect.

A solution in water of the cobalticyanide may be added to a silver halide emulsion with stirring before, after or preferably during the customary period of digestion. The solution of cobalticyanide may be divided into several portions, say two or three, which may be added at intervals, say 15 to 20 minutes apart.

By way of example, the following procedure may be adapted in making a silver chloride emulsion.

Two solutions I and II are made. For solution I 100 grs. of silver nitrate are dissolved in a small quantity of water, and the solution is made up with water to 300 ccs. For solution II, 35 grs. of ammonium chloride, 8 grs. of zinc acetate and 0.3 ccs. acetic acid are dissolved in a little water, and this solution is likewise made up with water to 300 ccs.

To produce the emulsion, 10 grs. of gelatine are dissolved in 100 ccs. of water, and 0.3 ccs. of acetic acid are added. At 28° C. 15 ccs. of solution I and 15 ccs. of solution II are poured into the gelatine solution in small quantities, so that the chloride is always in excess and so that the mixing is finished in the course of 1–2 minutes. The gelatine solution should be stirred vigorously during these additions.

The emulsion so produced is left in a water bath at 48–49° C. for 60 minutes, dependent on the nature of the gelatine used, after which a solution of potassium cobalticyanide is added, stirred well and digested further for 30 minutes at the same temperature. The emulsion may be used washed or unwashed, and one may add chrome alum, saponin, cupric salts, citrates, or other substances known for the production of chloride emulsions. The amount of potassium cobalticyanide added depends upon the gradation desired in the finished emulsion. If this substance is made up as a 1% solution in water and 2.5 ccs. thereof are added to the whole quantity of the emulsion (130 ccs.), a very hard emulsion is obtained, and even an addition of $\frac{1}{10}$ of this quantity (0.25 ccs.) will have a very considerable influence on the contrast of the emulsion. For comparison, one may make 3 emulsions, A, B, and C, of which A does not contain potassium cobalticyanide, B contains 0.25 ccs., and C contains 2.5 ccs. of a 1% solution of potassium cobalticyanide, and study the reactions of these three emulsions to a small quantity of bromide or iodide which is added after the emulsions are completed.

For this purpose, a 6% solution of gelatine is made, which is divided into 4 portions of 40 ccs. each. If these portions are called $G_1$, $G_2$, $G_3$ and $G_4$, then $G_1$ contains no further addition, $G_2$ contains as addition 0.5 ccs. of a 5% solution of potassium bromide, $G_3$ contains 1.0 ccs. of the same solution, while $G_4$ is like $G_3$ with only a further addition of 1.5 ccs. of a 1% potassium iodide solution.

By taking portions of 20 ccs. of respectively A, B, and C and adding to them 10 ccs. of respectively $G_1$, $G_2$, $G_3$ and $G_4$ one obtains 12 different emulsions, which are left for 15–20 minutes at 48° C., and they are then coated on paper and dried.

By determining the sensitivity and contrast of these emulsions after exposing and developing in an ordinary Velox Developer the effect of the potassium cobalticyanide on the emulsion can be ascertained.

Another series of tests may be made by using 17 and 19 ccs. of chloride solution instead of 15 ccs., while keeping the silver nitrate solution constant, via. 15 ccs. Also in these cases a content of respectively 0, 0.25 and 2.5 ccs. of potassium cobalticyanide solution will give widely different results.

As in the foregoing case, these emulsions are left for about one hour at 48–49° C., after which time the potassium cobalticyanide is added, and further digestion is continued for about 30 minutes at the same temperature.

I declare that what I claim is:

1. A photographic silver halide emulsion containing a water-soluble cobalticyanide in an amount less than 0.1% by weight of the wet emulsion.

2. A photographic silver halide emulsion containing silver chloride, and an alkali metal cobalticyanide in an amount less than 0.1% by weight of the wet emulsion.

3. A photographic silver halide emulsion containing an alkali metal cobalticyanide in an amount less than 0.01% by weight of the wet emulsion.

4. A photographic silver halide emulsion containing potassium cobalticyanide in an amount less than 0.01% by weight of the wet emulsion.

JENS HERMAN CHRISTENSEN.

No references cited.

Certificate of Correction

August 8, 1950

Patent No. 2,517,541

JENS HERMAN CHRISTENSEN

It is hereby certified that error appears in the printed specification of the above numbered patent requiring correction as follows:

Column 1, line 43, for "60 minutes" read *60–80 minutes*;

and that the said Letters Patent should be read as corrected above, so that the same may conform to the record of the case in the Patent Office.

Signed and sealed this 31st day of October, A. D. 1950.

[SEAL]

THOMAS F. MURPHY,
*Assistant Commissioner of Patents.*